United States Patent
Kato et al.

(10) Patent No.: US 10,236,647 B2
(45) Date of Patent: Mar. 19, 2019

(54) ROUTING MEMBERS CONNECTION STRUCTURE

(71) Applicant: Yazaki Corporation, Tokyo (JP)

(72) Inventors: Shingo Kato, Susono (JP); Yasuhiro Kominato, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/961,293

(22) Filed: Apr. 24, 2018

(65) Prior Publication Data

US 2018/0316146 A1 Nov. 1, 2018

(30) Foreign Application Priority Data

Apr. 27, 2017 (JP) .................................. 2017-088263

(51) Int. Cl.
    *H01M 2/24* (2006.01)
    *H01R 25/16* (2006.01)
    *H01R 4/34* (2006.01)

(52) U.S. Cl.
    CPC .............. *H01R 25/162* (2013.01); *H01R 4/34* (2013.01); *H01R 25/161* (2013.01)

(58) Field of Classification Search
    CPC .............................. Y02E 60/12; H01M 2/206
    USPC ....................................................... 429/158
    See application file for complete search history.

(56) References Cited

U.S. PATENT DOCUMENTS

| | | | | |
|---|---|---|---|---|
| 8,027,023 B2 * | 9/2011 | Hembacher | ......... | G03F 7/70241 355/55 |
| 8,313,855 B2 * | 11/2012 | Muis | ..................... | H01M 2/206 429/158 |
| 8,882,547 B2 * | 11/2014 | Asakuma | ................. | H01R 4/42 439/810 |
| 8,939,801 B2 * | 1/2015 | Tong | ................... | H01M 2/1077 439/762 |
| 2016/0137083 A1 * | 5/2016 | Cho | ..................... | H01R 13/641 307/140 |

FOREIGN PATENT DOCUMENTS

JP 2016-220276 A 12/2016

* cited by examiner

*Primary Examiner* — Phuong Chi T Nguyen
(74) *Attorney, Agent, or Firm* — Sughrue Mion, PLLC

(57) ABSTRACT

A routing members connection structure electrically connects a long first trunk routing member which is routed in a vehicle and can transmit power and a first branch routing member routed in the vehicle, can transmit power, and branches off from the first trunk routing member. Each of the first trunk routing member and the first branch routing member has a flat conductor and an insulator that is formed on the outer circumferential surface of the flat conductor. The first trunk routing member has a post-shaped first stud bolt that is made of a metal and extends outward from a first branching portion where the flat conductor is exposed without being covered with the insulator. The flat conductor of the first trunk routing member and the flat conductor of the first branch routing member are electrically connected to each other via the first stud bolt.

5 Claims, 10 Drawing Sheets

ROUTING MEMBERS CONNECTION STRUCTURE

CROSS REFERENCE TO RELATED APPLICATIONS

This application is based on and claims priority from Japanese patent application No. 2017-088263 filed on Apr. 27, 2017, the entire contents of which are incorporated herein by reference.

BACKGROUND OF THE INVENTION

1. Technical Field

The present invention relates to a routing members connection structure for electrically connecting a long trunk routing member(s) that is routed in a vehicle and can transmit power and a branch routing member(s) that is routed in the vehicle, can transmit power, and branches off from the trunk routing member.

2. Background Art

Routing members connection structures for electrically connecting a long trunk routing member(s) that is routed in a vehicle and can transmit power and a branch routing member(s) that is routed in the vehicle, can transmit power, and branches off from the trunk routing member are known. An example of such connection structures is one used in a vehicle in which a battery is installed on the rear side. In this connection structure, a branch routing member for supplying power to another electric device is electrically connected to a halfway portion of a long trunk routing member that is routed in the front-rear direction of the vehicle to supply power from the rear-side battery to a front-side electric device.

In conventional routing members connection structures, usually, a trunk routing member is cut at a branching position and a cutting portion of each of two resulting trunk routing members is provided with a terminal structure. The terminal structures are connected to prescribed connection portions of a power branching box individually by bolt fastening, and branch routing members are connected to other connection portions of the power branching box individually by bolt fastening (refer to Patent document JP-A-2016-220276, for example).

With this routing members connection structure, the two divisional trunk routing members are electrically connected to each other via an electric circuit provided in the power branching box and are also electrically connected to the branch routing members via the electric circuit provided in the power branching box.

SUMMARY

Because the two divisional trunk routing members are electrically connected to each other via the power branching box, the above routing members connection structure has a problem that the reliability of the electrical connection of the trunk routing members is prone to be lower than in a case that a single trunk routing member extends continuously over the full length in its longitudinal direction without being cut.

The present invention has been made in view of the above circumstances, and an object of the invention is therefore to provide a routing members connection structure for electrically connecting a long trunk routing member(s) that is routed in a vehicle and can transmit power and a branch routing member(s) that is routed in the vehicle, can transmit power, and branches off from the trunk routing member, the routing members connection structure being high in the reliability of the electrical connection of the trunk routing member.

To attain the above object, the invention provides routing members connection structures of the following items (1) to (5):

(1) A routing members connection structure which electrically connects a long first trunk routing member which is routed in a vehicle and can transmit power and a first branch routing member which is routed in the vehicle, can transmit power, and branches off from the first trunk routing member, wherein:

each of the first trunk routing member and the first branch routing member has a conductor and an insulator that is formed on an outer circumferential surface of the conductor;

the first trunk routing member has a post-shaped first fastening member that is made of a metal and extends outward from a first branching portion where the conductor is exposed without being covered with the insulator; and the conductor of the first trunk routing member and the conductor of the first branch routing member are electrically connected to each other via the first fastening member.

(2) The routing members connection structure according to item (1), further comprising a long second trunk routing member which is routed in the vehicle so as to be laid on the first trunk routing member and can transmit power and a second branch routing member which is routed in the vehicle, can transmit power, and branches off from the second trunk routing member, wherein:

the second trunk routing member has a conductor and an insulator that is interposed at least between the conductor of the second trunk routing member and the conductor of the first trunk routing member;

the second branch routing member has a conductor and an insulator that is formed on an outer circumferential surface of the conductor;

the first trunk routing member has a through-hole that penetrates through the first trunk routing member in a lamination direction of the first trunk routing member and the second trunk routing member;

the second trunk routing member has a post-shaped second fastening member that is made of a metal and extends outward from a second branching portion where the conductor is exposed without being covered with the insulator toward the side of the first trunk routing member;

the second fastening member is inserted through the through-hole past one opening thereof facing the second trunk routing member and a tip-side portion of the second fastening member projects from the other opening of the through-hole; and the conductor of the second trunk routing member and the conductor of the second branch routing member are electrically connected to each other via the tip-side portion of the second fastening member.

(3) The routing members connection structure according to item (1), further comprising a long second trunk routing member which is routed in the vehicle so as to be laid on the first trunk routing member and can transmit power and a second branch routing member which is routed in the vehicle, can transmit power, and branches off from the second trunk routing member, wherein:

the second trunk routing member has a conductor and an insulator that is interposed at least between the conductor of the second trunk routing member and the conductor of the first trunk routing member;

the second branch routing member has a conductor and an insulator that is formed on an outer circumferential surface of the conductor;

the second trunk routing member has, in a region in a longitudinal direction of the first trunk routing member and the second trunk routing member, a non-laminated portion where at least one of the first trunk routing member and the second trunk routing member is curved in a width direction that is perpendicular to the longitudinal direction and a lamination direction of the first trunk routing member and the second trunk routing member and hence the second trunk routing member is not laid on and is spaced from the first trunk routing member;

the second trunk routing member has a post-shaped second fastening member that is made of a metal and extends outward from a second branching portion that is part of the non-laminated portion and where the conductor is exposed without being covered with the insulator; and the conductor of the second trunk routing member and the conductor of the second branch routing member are electrically connected to each other via the second fastening member.

(4) The routing members connection structure according to item (1), further comprising a long second trunk routing member which is routed in the vehicle so as to be laid on the first trunk routing member and can transmit power and a second branch routing member which is routed in the vehicle, can transmit power, and branches off from the second trunk routing member, wherein:

the second trunk routing member has a conductor and an insulator that is interposed at least between the conductor of the second trunk routing member and the conductor of the first trunk routing member;

the second branch routing member has a conductor and an insulator that is formed on an outer circumferential surface of the conductor;

the first trunk routing member has a cut that extends from a side edge on one side in a width direction that is perpendicular to a longitudinal direction and a lamination direction of the first trunk routing member and the second trunk routing member toward the other side edge in the width direction;

the second trunk routing member has an exposed portion that coextends with the cut and hence is exposed without being covered with the first trunk routing member;

the second trunk routing member has a post-shaped second fastening member that is made of a metal and extends outward toward the side of the first trunk routing member from a second branching portion that is part of the exposed portion and where the conductor is exposed without being covered with the insulator; and the conductor of the second trunk routing member and the conductor of the second branch routing member are electrically connected to each other via the second fastening member.

(5) The routing members connection structure according to item (1), further comprising a power branching box which is disposed in the vehicle so as to cover a connection portion of the first trunk routing member and the first branch routing member and houses a board on which an electric circuit is formed, wherein:

the first fastening member is connected to a first portion of the board and the conductor of the first branch routing member is connected to a second portion that is different from the first portion; and the conductor of the first trunk routing member and the conductor of the first branch routing member are electrically connected to each other via the first fastening member and the electric circuit of the board.

In the routing members connection structure of item (1), the post-shaped first fastening member is provided at the first branching portion that is located at a halfway position of the long first trunk routing member and the first trunk routing member and the first branch routing member are electrically connected to each other via the first fastening member. That is, the first trunk routing member and the first branch routing member are electrically connected to each other in such a manner that the first trunk routing member extends continuously over its full longitudinal length without being cut. As a result, according to this routing members connection structure, the reliability of the electrical connection of the first trunk routing member can be made higher than in the above-described conventional routing members connection structure.

According to the routing members connection structure of item (2), a first mode can be provided that realizes a structure that allows the long first trunk routing member and the long second trunk routing member being laid on each other to be routed in the vehicle and in which the first trunk routing member and the first branch routing member are electrically connected to each other and the second trunk routing member and the second branch routing member are electrically connected to each other, in such a manner that both of the first trunk routing member and the second trunk routing member extend continuously over the full length in their longitudinal direction without being cut. In this case, it is preferable to interpose an insulating member between the inner wall surface of the through-hole of the first trunk routing member and the side wall surface of the post-shaped second fastening member, inserted in the through-hole, of the second trunk routing member.

According to the routing members connection structure of item (3), a second mode can be provided that realizes a structure that allows the long first trunk routing member and the long second trunk routing member being laid on each other to be routed in the vehicle and in which the first trunk routing member and the first branch routing member are electrically connected to each other and the second trunk routing member and the second branch routing member are electrically connected to each other, in such a manner that both of the first trunk routing member and the second trunk routing member extend continuously over the full length in their longitudinal direction without being cut.

According to the routing members connection structure of item (4), a third mode can be provided that realizes a structure that allows the long first trunk routing member and the long second trunk routing member being laid on each other to be routed in the vehicle and in which the first trunk routing member and the first branch routing member are electrically connected to each other and the second trunk routing member and the second branch routing member are electrically connected to each other, in such a manner that both of the first trunk routing member and the second trunk routing member extend continuously over the full length in their longitudinal direction without being cut.

According to the routing members connection structure of item (5), the electrical connection between the first trunk routing member and the first branch routing member can be on/off-switched in a desired manner by, for example, forming, in the electric circuit of the board housed in the power branching box, a switch mechanism for allowing or prohibiting conduction between the first portion and the second portion of the board.

The invention makes it possible to provide a routing members connection structure for electrically connecting a long trunk routing member(s) that is routed in a vehicle and can transmit power and a branch routing member(s) that is routed in the vehicle, can transmit power, and branches off from the trunk routing member, the routing members connection structure being high in the reliability of the trunk routing member.

The invention has been described above concisely. The details of the invention will become more apparent when the modes for carrying out the invention (hereinafter referred to as embodiments) described below are read through with reference to the accompanying drawings.

DETAILED DESCRIPTION OF EMBODIMENTS

Specific embodiments of the present invention will be hereinafter described with reference to the drawings.

Embodiment 1

Figure 1:
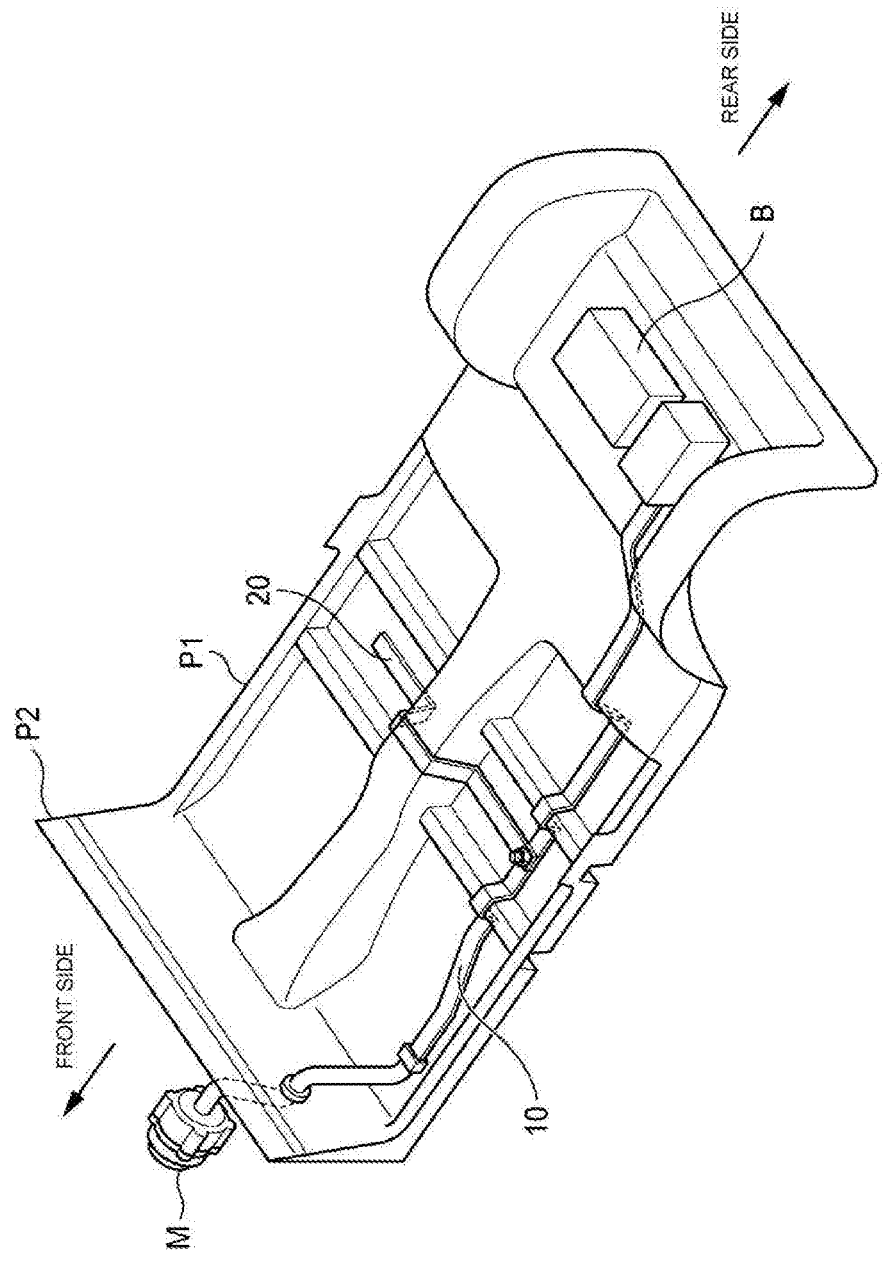
FIG. 1 is a perspective view showing a manner of routing of routing members in a case that a routing members connection structure according to a first embodiment of the present invention is mounted in a vehicle.

A routing members connection structure according to a first embodiment of the invention will be described with reference to FIGS. 1-3. As shown in FIG. 1, this connection structure is equipped with a long first trunk routing member 10 capable of transmitting power and a first branch routing member 20 which can transmit power and branches off from the first trunk routing member 10. In this embodiment, the overall length of the first branch routing member 20 is shorter than that of the first trunk routing member 10.

In the example shown in FIG. 1, the connection structure is mounted in a vehicle in which a battery B is installed on its rear side. The long first trunk routing member 10 is routed in the vehicle front-rear direction on the top surface of a floor panel P1 of the vehicle. The rear end of the first trunk routing member 10 is connected to the battery B installed on the rear side. The first trunk routing member 10 is inserted through a through-hole formed in a dash panel P2 and its front end is connected to an electric device M installed in an engine room. The first trunk routing member 10 is also called a backbone because it extends thus in the vehicle front-rear direction on the top surface of the floor panel P1.

The first branch routing member 20 branches off from the first trunk routing member 10 from a halfway position of the latter so as to be electrically connected to the latter, and is routed rightward on the top surface of the floor panel P1. The tip of the first branch routing member 20 is connected to another electric device (not shown). In this example, the first trunk routing member 10 is used as a trunk power line for supplying power to the electric device M and the other electric device, and the first branch routing member 20 is used as a branch power line for supplying power to the other electric device.

Figure 2:
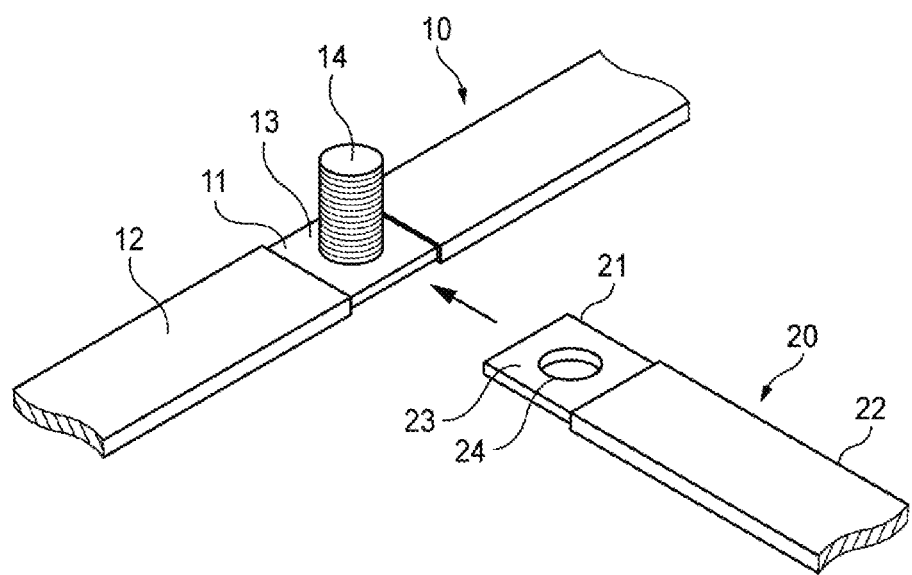
FIG. 2 is an enlarged perspective view showing a state, before connection, of a connection portion of the connection structure shown in FIG. 1.
Figure 3:
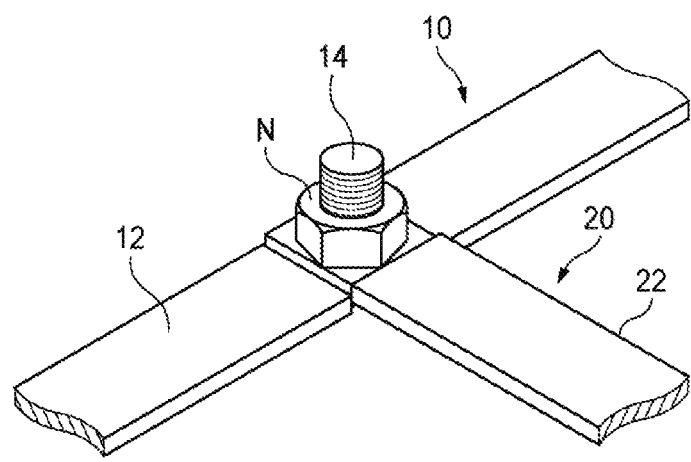
FIG. 3 is an enlarged perspective view showing a state, after the connection, of the connection portion of the connection structure shown in FIG. 1.

As shown in FIG. 2, the first trunk routing member 10 is composed of a belt-shaped flat conductor 11 which is flat in cross section and is made of a metal material (e.g., copper alloy or aluminum alloy) and a resin insulator 12 which covers the flat conductor 11 fully in its circumferential direction. For example, the combination of the flat conductor 11 and the insulator 12 covering it may be manufactured by extrusion molding or lamination molding.

A portion, from which the first branch routing member 20 branches off, of the first trunk routing member 10 is a first branching portion 13 where the flat conductor 11 is exposed without being covered with the insulator 12. The first branching portion 13 may be such as to correspond to either the entire circumference of the flat conductor 11 (see FIG. 2) or only the top surface of the flat conductor 11.

A first stud bolt 14 which is made of a metal and shaped like a straight cylinder is joined to the top surface of the first branching portion 13 (i.e., the exposed top surface of the flat conductor 11) so as to project upward. Example joining methods are ultrasonic joining and friction stir welding. The first stud bolt 14 may be integrated with the flat conductor 11 originally.

As shown in FIG. 2, like the first trunk routing member 10, the first branch routing member 20 is composed of a belt-shaped flat conductor 21 which is flat in cross section and is made of a metal material (e.g., copper alloy or aluminum alloy) and a resin insulator 22 which covers the flat conductor 21 fully in its circumferential direction. For example, the combination of the flat conductor 21 and the insulator 22 covering it may be manufactured by extrusion molding or lamination molding.

A first terminal portion 23 where the flat conductor 21 is exposed without being covered with the insulator 22 over the entire circumference is formed at the end, located on the side of connection to the first trunk routing member 10, of the first branch routing member 20. A through-hole 24 is formed through the first terminal portion 23.

Work of connecting the first trunk routing member 10 and the first branch routing member 20 to each other will be described with reference to FIG. 3. First, the first stud bolt 14 of the first trunk routing member 10 is inserted into the through-hole 24 of the first terminal portion 23 of the first branch routing member 20 from below and the first terminal portion 23 is placed on the first branching portion 13. In this state, a tip-side portion of the first stud bolt 14 projects upward from the top opening of the through-hole 24.

Then a nut N is screwed on the first stud bolt 14 (bolt fastening), whereby the connection work is completed. As a result, a state is established that the first branch routing member 20 branches off directly from the first branching portion 13 (first stud bolt 14) of the first trunk routing member 10 and the flat conductor 11 of the first trunk routing member 10 and the flat conductor 21 of the first branch routing member 20 are electrically connected to each other via the first stud bolt 14.

In the above-described routing members connection structure according to the first embodiment of the invention, the columnar first stud bolt 14 is provided at the first branching portion 13 which is located at the halfway position of the long first trunk routing member 10 and the first trunk routing member 10 and the first branch routing member 20 are electrically connected to each other via the first stud bolt 14. That is, the first trunk routing member 10 and the first branch routing member 20 are electrically connected to each other in such a manner that the first trunk routing member 10 extends continuously over its full longitudinal length without being cut. As a result, the reliability of the electrical connection of the first trunk routing member 10 can be made higher than in the above-described conventional routing members connection structure.

Since the first trunk routing member 10 extends continuously over its full longitudinal length without being cut, the number of bolt fastening locations, that is, contacts for electrical connection, is smaller than in the above-described conventional routing members connection structure. This also contributes to increasing the reliability of the electrical connection of the first trunk routing member 10.

Since the number of bolt fastening locations is smaller than in the above-described conventional routing members connection structure, the number of assembling steps of connection work can be decreased. In addition, since the first trunk routing member 10 is not cut, the number of components can be made smaller than in the above-described conventional routing members connection structure.

The first trunk routing member 10 which constitutes a backbone needs to have a conductor that is large in cross section to secure a prescribed current capacity, and has, in the embodiment, the belt-shaped flat conductor 11 which is flat in cross section. As such, the conductor of the first trunk routing member 10 makes it possible to secure the prescribed current capacity with a sufficient margin. Furthermore, the flat conductor 11 can be bent easily in the thickness direction, which facilitates work of routing the first trunk routing member 10 along a prescribed route.

Embodiment 2

Next, a routing members connection structure according to a second embodiment of the invention will be described with reference to FIGS. 4 and 5. The second embodiment is different from the above-described first embodiment in which the first branch routing member 20 branches off directly from the first branching portion 13 (first stud bolt 14) of the first trunk routing member 10 in that the first branch routing member 20 branches off from the first branching portion 13 (first stud bolt 14) of the first trunk routing member 10 via a power branching box 50.

Only the above difference will be described below. In FIGS. 4 and 5, components having the same or equivalent ones in the first embodiment are given the same symbols as the latter. This type of notation will also apply to FIGS. 6-8.

Figure 4:
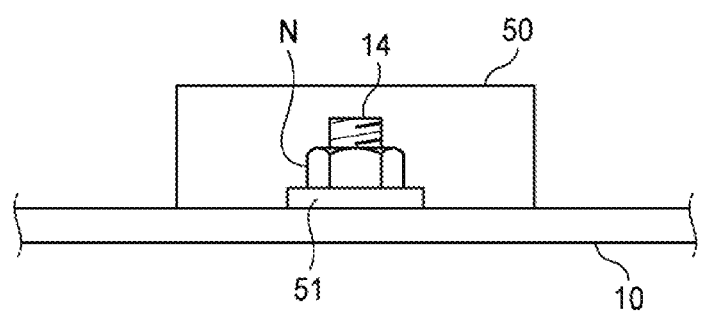
FIG. 4 is a schematic diagram illustrating a routing members connection structure according to a second embodiment of the invention.

In the second embodiment, as shown in FIG. 4, the power branching box 50 is mounted on the top surface of the floor panel P1 so as to cover a connection portion of the first trunk routing member 10 and the first branch routing member 20. The power branching box 50 houses a board 51 which is formed with an electric circuit.

Figure 5:
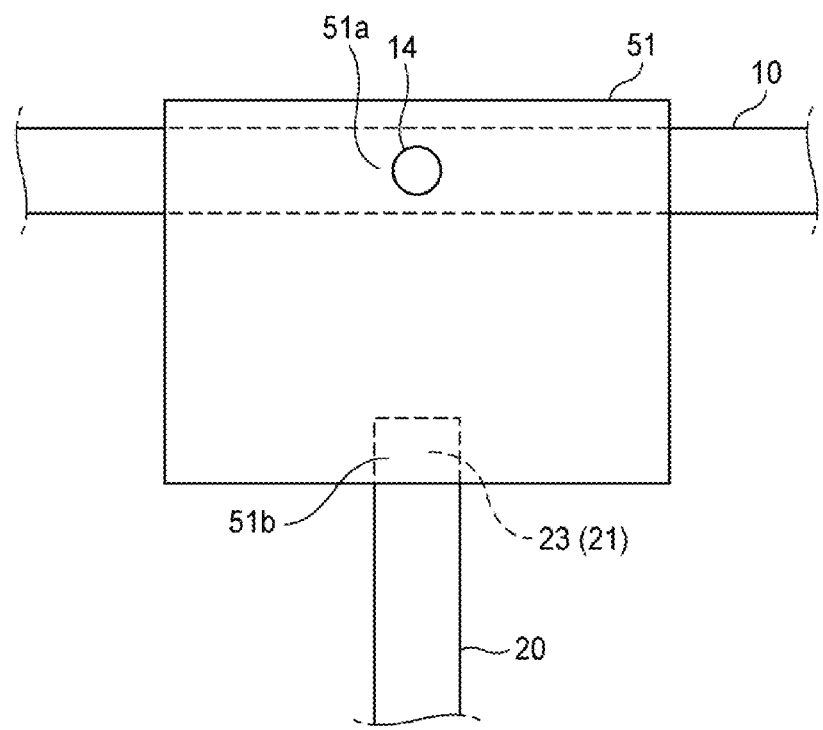
FIG. 5 is a top view of a board that is employed in the connection structure shown in FIG. 4.

As shown in FIG. 5, the first stud bolt 14 is connected to a first portion 51*a* of the board 51 and the first terminal portion 23 of the first branch routing member 20 is connected to a second portion 51*b*, being different from the first portion 51*a*, of the board 51. As a result, the flat conductor 11 of the first trunk routing member 10 and the flat conductor 21 of the first branch routing member 20 are electrically connected to each other via the first stud bolt 14 and the electric circuit of the board 51.

Although in the second embodiment the first trunk routing member 10 is routed on the top surface of the floor panel P1, the first trunk routing member 10 may be routed on the bottom surface the floor panel P1. In this case, the first stud bolt 14 which is joined to the flat conductor 11 of the first trunk routing member 10 is inserted from under a through-hole formed through the floor panel P1 so as to project upward from the top opening of the through-hole. The first stud bolt 14 which projects from the level of the top surface of the floor panel P1 is connected to the first portion 51*a* of the board 51 which is housed in the power branching box 50 which is mounted on the top surface of the floor panel P1.

In this case, to secure sufficient insulation between the first stud bolt 14 and the floor panel P1, it is preferable to form a ring-shaped gap between the inner wall surface of the through-hole of the floor panel P1 and the side wall surface of the first stud bolt 14. To secure an even higher level of insulation, it is appropriate to dispose an insulating member in the ring-shaped gap. To this end, it is desirable to cause an insulating material to flow into the ring-shaped gap or fit an insulating ring made of rubber into the ring-shaped gap.

According to the above-described second embodiment, the electrical connection between the first trunk routing member 10 and the first branch routing member 20 can be on/off-switched in a desired manner by, for example, forming, in the electric circuit of the board 51 housed in the power branching box 50, a switch mechanism (not shown) for allowing or prohibiting conduction between the first portion 51*a* and the second portion 51*b* of the board 51.

Embodiment 3

Next, a routing members connection structure according to a third embodiment of the invention will be described with reference to FIG. 6. The third embodiment is different from the above-described first embodiment in which the first trunk routing member 10 is mainly used singly in that a laminate body of the first trunk routing member 10 and a second trunk routing member 30 is used as a long trunk routing member that constitutes a backbone.

Figure 6:
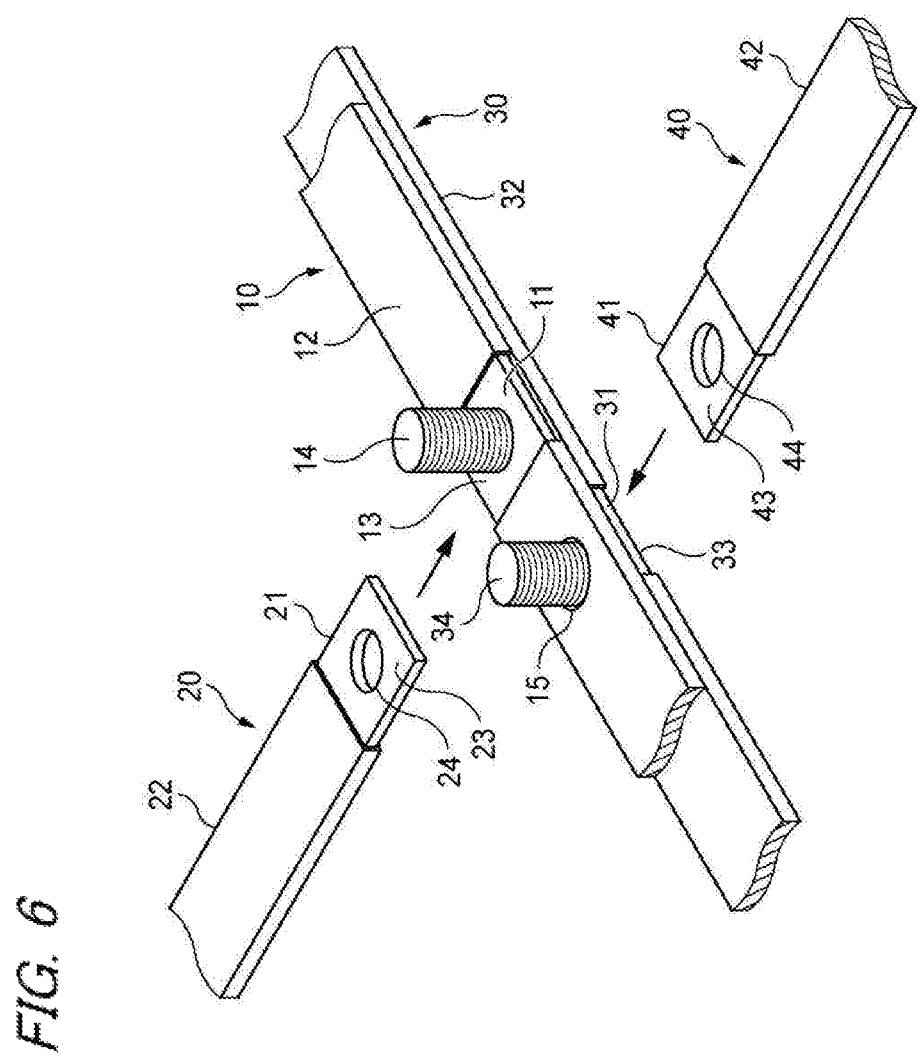
FIG. 6 is an enlarged perspective view showing a state, before connection, of a connection portion of a routing members connection structure according to a third embodiment of the invention.

As shown in FIG. 6, the routing members connection structure according to the third embodiment is further equipped with a long second trunk routing member 30 capable of transmitting power and a second branch routing member 40 which can transmit power and branches off from the second trunk routing member 30. In this embodiment, the overall length of the second branch routing member 40 is shorter than that of the second trunk routing member 30.

Like the first trunk routing member 10, the second trunk routing member 30 is composed of a belt-shaped flat conductor 31 which is flat in cross section and is made of a metal material (e.g., copper alloy or aluminum alloy) and a resin insulator 32 which covers the flat conductor 31 fully in its circumferential direction. For example, the combination of the flat conductor 31 and the insulator 32 covering it may be manufactured by extrusion molding or lamination molding.

The second trunk routing member 30 is laid on and fixed to, with adhesive or the like, the bottom surface of the first trunk routing member 10 over the full length in its longitudinal direction. A long laminate body formed by laying the first trunk routing member 10 and the second trunk routing member 30 on each other in the thickness direction constitutes a long trunk routing member as a backbone. The second trunk routing member 30 is used as a backup trunk power line to accommodate, for example, an event that an abnormality occurs in the first trunk routing member 10. Alternatively, the second trunk routing member 30 may be used for transmitting power at a different voltage than the first trunk routing member 10 does or used as a ground line.

A through-hole 15 penetrates through the first trunk routing member 10 in the lamination direction of the first trunk routing member 10 and the second branch routing member 40, that is, the thickness direction of the first trunk routing member 10, at a position in the vicinity of its first branching portion 13 in its longitudinal direction. In this example, the through-hole 15 is circular.

A second branching portion 33 where the flat conductor 31 is exposed without being covered with the insulator 32 is formed in the second trunk routing member 30 at such a position in its longitudinal direction as to correspond to the through-hole 15. The second branching portion 33, that is, the portion where the flat conductor 31 is exposed, may be such as to correspond to either the entire circumference of the flat conductor 31 (see FIG. 6) or only the top surface of the flat conductor 31.

A second stud bolt 34 which is made of a metal and shaped like a straight cylinder is joined to the top surface of the second branching portion 33 (i.e., the exposed top surface of the flat conductor 31) so as to project upward. Example joining methods are ultrasonic joining and friction stir welding. The second stud bolt 34 may be integrated with the flat conductor 31 originally. The second stud bolt 34 is inserted through the through-hole 15 from below and its tip-side portion projects from the top opening of the through-hole 15. As a result, the first stud bolt 14 and the second stud bolt 34 are arranged side by side in the longitudinal direction.

To secure sufficient insulation between the first trunk routing member 10 and the second trunk routing member 30, a ring-shaped gap is formed between the inner wall surface of the through-hole 15 of the first trunk routing member 10 (in particular, the inner wall surface of the through-hole of the flat conductor 11) and the side wall surface of the second stud bolt 34 which is joined to the flat conductor 31 of the second trunk routing member 30 and inserted in the through-hole 15. To secure an even higher level of insulation, it is preferable to dispose an insulating member in the ring-shaped gap. To this end, it is desirable to cause an insulating material to flow into the ring-shaped gap or fit an insulating ring made of rubber into the ring-shaped gap.

As shown in FIG. 6, like the second trunk routing member 30, the second branch routing member 40 is composed of a belt-shaped conductor 41 which is flat in cross section and is made of a metal material (e.g., copper alloy or aluminum alloy) and a resin insulator 42 which covers the flat conductor 41 fully in its circumferential direction. For example, the combination of the flat conductor 41 and the insulator 42 covering it may be manufactured by extrusion molding or lamination molding.

A second terminal portion 43 where the flat conductor 41 is exposed without being covered with the insulator 42 over the entire circumference is formed at the end, located on the side of connection to the second trunk routing member 30, of the second branch routing member 40. A through-hole 44 is formed through the second terminal portion 43.

The method for connecting the first trunk routing member 10 and the first branch routing member 20 to each other is the same as in the first embodiment and hence is not described here again. The second trunk routing member 30 and the second branch routing member 40 are connected to each other in a manner similar to the manner the first trunk routing member 10 and the first branch routing member 20 are connected to each other. That is, the second stud bolt 34 which is joined to the flat conductor 31 of the second trunk routing member 30 is inserted into the through-hole 44 of the second terminal portion 43 of the second branch routing member 40 and then a nut is screwed on the second stud bolt 34 (bolt fastening). As a result, a state is established that the second branch routing member 40 branches off directly from the second branching portion 33 (second stud bolt 34) of the second trunk routing member 30 and the flat conductor 31 of the second trunk routing member 30 and the flat conductor 41 of the second branch routing member 40 are electrically connected to each other via the second stud bolt 34.

According to the above-described third embodiment, the structure that allows the long first trunk routing member 10 and the long second trunk routing member 30 being laid on each other to be routed in the vehicle and in which the first trunk routing member 10 and the first branch routing member 20 are electrically connected to each other and the second trunk routing member 30 and the second branch routing member 40 are electrically connected to each other can be realized in such a manner that both of the first trunk routing member 10 and the second trunk routing member 30 extend continuously over the full length in their longitudinal direction without being cut.

Embodiment 4

Next, a routing members connection structure according to a fourth embodiment of the invention will be described with reference to FIG. 7. The fourth embodiment is different from the above-described third embodiment in which the first stud bolt 14 and the second stud bolt 34 are arranged side by side in the longitudinal direction by forming the through-hole 15 through the first trunk routing member 10 in that the first stud bolt 14 and the second stud bolt 34 are arranged side by side in the width direction (i.e., the direction perpendicular to the longitudinal direction and the lamination direction) by using a second trunk routing member 30 having a non-laminated portion 35.

Figure 7:
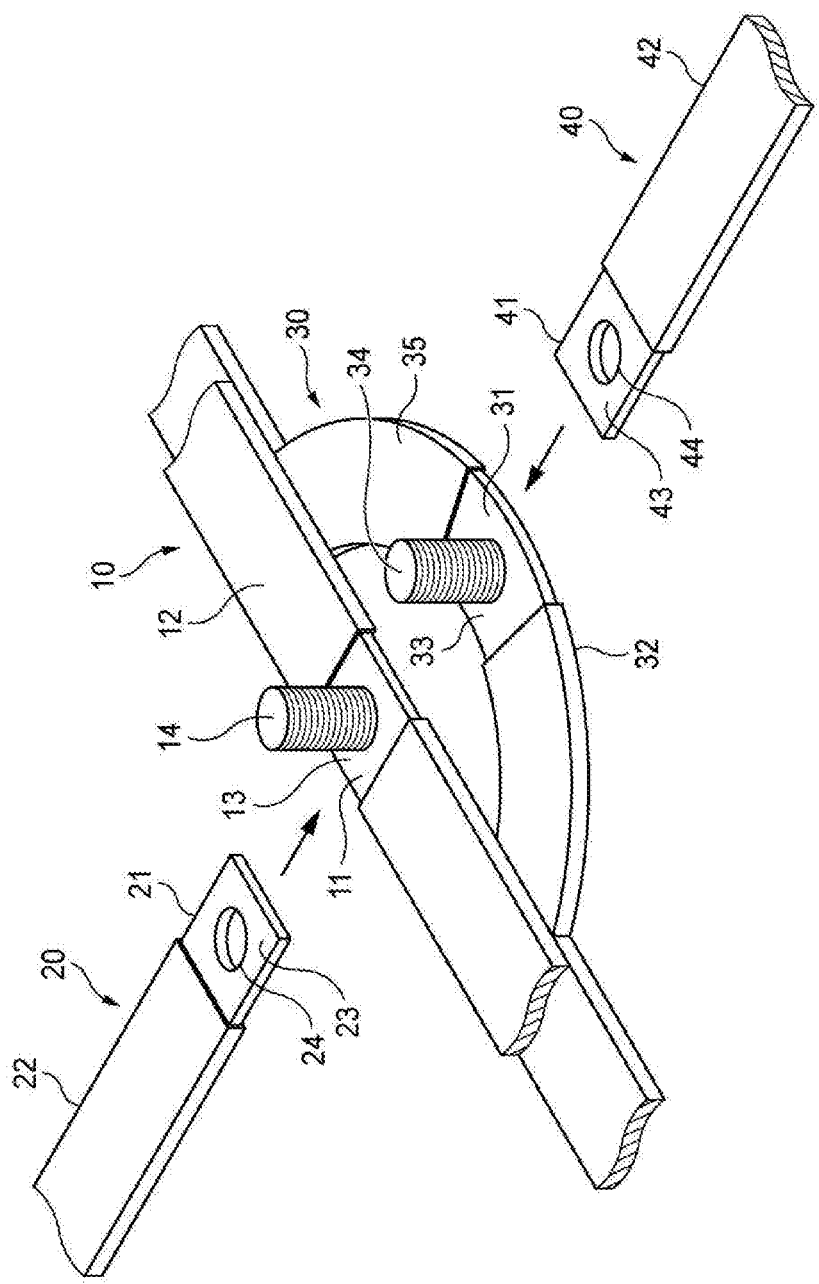
FIG. 7 is an enlarged perspective view showing a state, before connection, of a connection portion of a routing members connection structure according to a fourth embodiment of the invention.

As shown in FIG. 7, in the fourth embodiment, the second trunk routing member 30 has, at a position corresponding to the first branching portion 13 in the longitudinal direction of the first trunk routing member 10 and the second trunk routing member 30, the non-laminated portion 35 where the second trunk routing member 30 is curved in the width direction and hence is not laid on the first trunk routing member 10 (i.e., is spaced from the first trunk routing member 10). Alternatively, a non-laminated portion 35 may be formed in the second trunk routing member 30 as a result of curving of the first trunk routing member 10 or both of the first trunk routing member 10 and the second trunk routing member 30 in the width direction.

A second branching portion 33 is formed in the non-laminated portion 35 of the second trunk routing member 30 at such a position in the longitudinal direction as to be opposed to the first branching portion 13, and the second stud bolt 34 is joined to the top surface of the second branching portion 33 (i.e., the exposed top surface of the flat conductor 31) so as to project upward. As a result, the first stud bolt 14 and the second stud bolt 34 are arranged side by side in the width direction.

The method for connecting the first trunk routing member 10 and the first branch routing member 20 to each other and the method for connecting the second trunk routing member 30 and the second branch routing member 40 to each other are the same as or similar to the methods employed in the third embodiment and hence are not described here again.

In the above-described fourth embodiment, as in the above-described third embodiment, the structure that allows the long first trunk routing member 10 and the long second trunk routing member 30 being laid on each other to be routed in the vehicle and in which the first trunk routing member 10 and the first branch routing member 20 are electrically connected to each other and the second trunk routing member 30 and the second branch routing member 40 are electrically connected to each other can be realized in such a manner that both of the first trunk routing member 10 and the second trunk routing member 30 extend continuously over the full length in their longitudinal direction without being cut.

Embodiment 5

Next, a routing members connection structure according to a fifth embodiment of the invention will be described with reference to FIG. 8. The fifth embodiment is different from the above-described fourth embodiment in which the first stud bolt 14 and the second stud bolt 34 are arranged side by side in the width direction by forming the non-laminated portion 35 in the second trunk routing member 30 in that the first stud bolt 14 and the second stud bolt 34 are arranged side by side in the width direction by using a first trunk routing member 10 having a cut 16.

Figure 8:
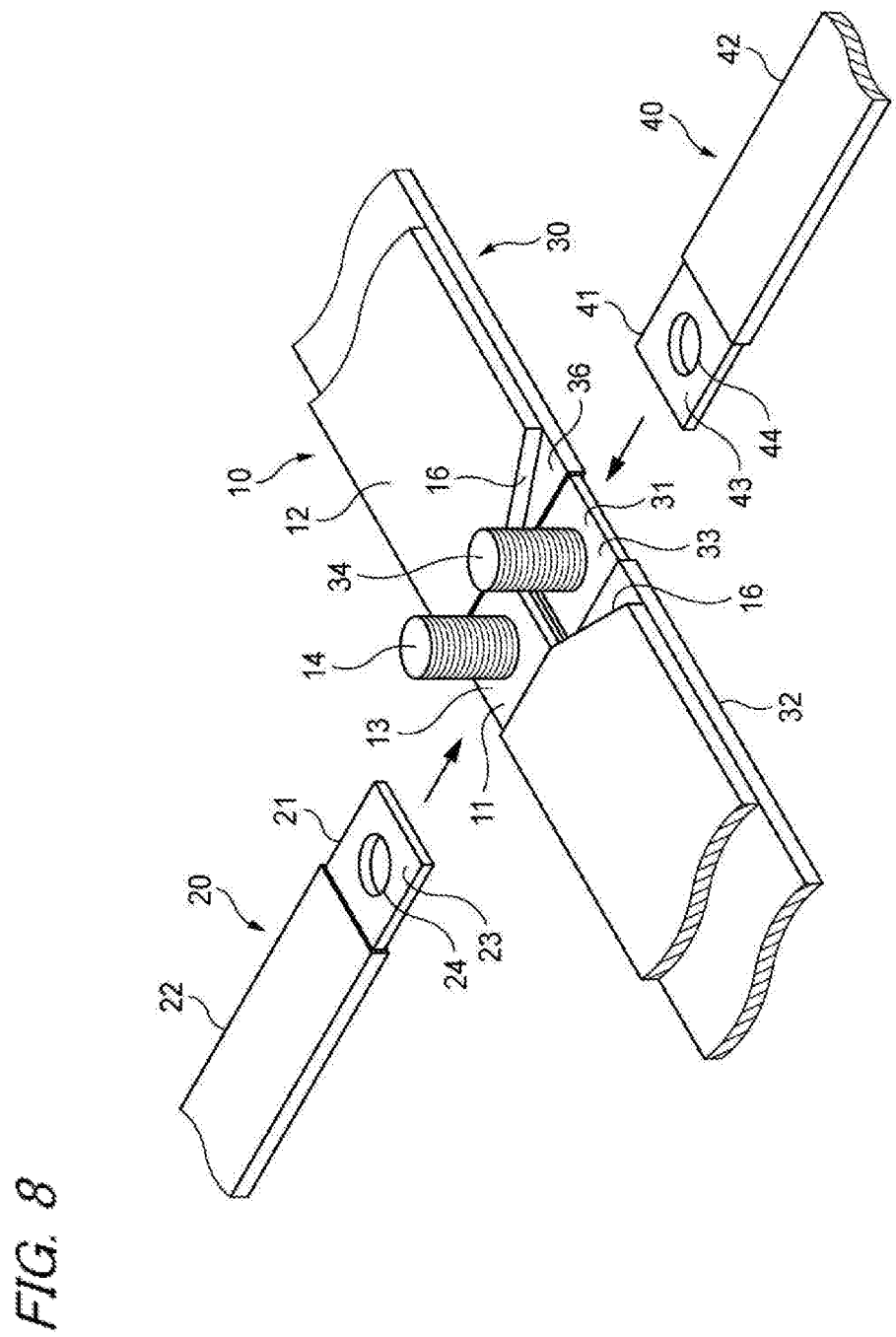
FIG. 8 is an enlarged perspective view showing a state, before connection, of a connection portion of a routing members connection structure according to a fifth embodiment of the invention.

As shown in FIG. 8, in the fifth embodiment, the cut 16 is formed in the first trunk routing member 10 at the same position as a first branching portion 13 is in the longitudinal direction of the first trunk routing member 10 and a second trunk routing member 30 so as to extend in the width direction from one edge to approximately a center position in the width direction toward the other edge. In this embodiment, because of the presence of the cut 16, the first branching portion 13 extends from approximately the center position to the other edge in the width direction. Thus, the first stud bolt 14 is formed at a position that is closer to the other edge than the one edge is in the width direction.

Because of the presence of the cut 16, the second trunk routing member 30 has an exposed portion 36 which is not covered with the first trunk routing member 10. A second branching portion 33 is formed in the second trunk routing member 30 approximately at the center of the exposed portion 36 and the second stud bolt 34 is joined to the top surface of the second branching portion 33 (i.e., the exposed top surface of the flat conductor 31) so as to project upward. As a result, the second stud bolt 34 is formed at a position that is closer to the one edge in the width direction than the other edge is in the width direction and the first stud bolt 14 and the second stud bolt 34 are arranged side by side in the width direction.

Alternatively, the cut 16 may be formed at a position that is not the same as a position of the first branching portion 13 in the longitudinal direction of the first trunk routing member 10 and the second trunk routing member 30. In this case, the first stud bolt 14 and the second stud bolt 34 are located at different positions in the longitudinal direction.

The method for connecting the first trunk routing member 10 and the first branch routing member 20 to each other and the method for connecting the second trunk routing member 30 and the second branch routing member 40 to each other are the same as or similar to the methods employed in the third and fourth embodiments and hence are not described here again.

In the above-described fifth embodiment, as in the above-described third and fourth embodiments, the structure that allows the long first trunk routing member 10 and the long second trunk routing member 30 being laid on each other to be routed in the vehicle and in which the first trunk routing member 10 and the first branch routing member 20 are electrically connected to each other and the second trunk routing member 30 and the second branch routing member 40 are electrically connected to each other can be realized in such a manner that both of the first trunk routing member 10 and the second trunk routing member 30 extend continuously over the full length in their longitudinal direction without being cut.

Embodiment 6

Next, a routing members connection structure according to a sixth embodiment of the invention will be described with reference to FIGS. 9A and 9B and FIG. 10. The sixth embodiment is different from the above-described embodiments in that the first trunk routing member 10 and the first branch routing member 20 are connected to each other by ultrasonic joining.

Figure 9A:
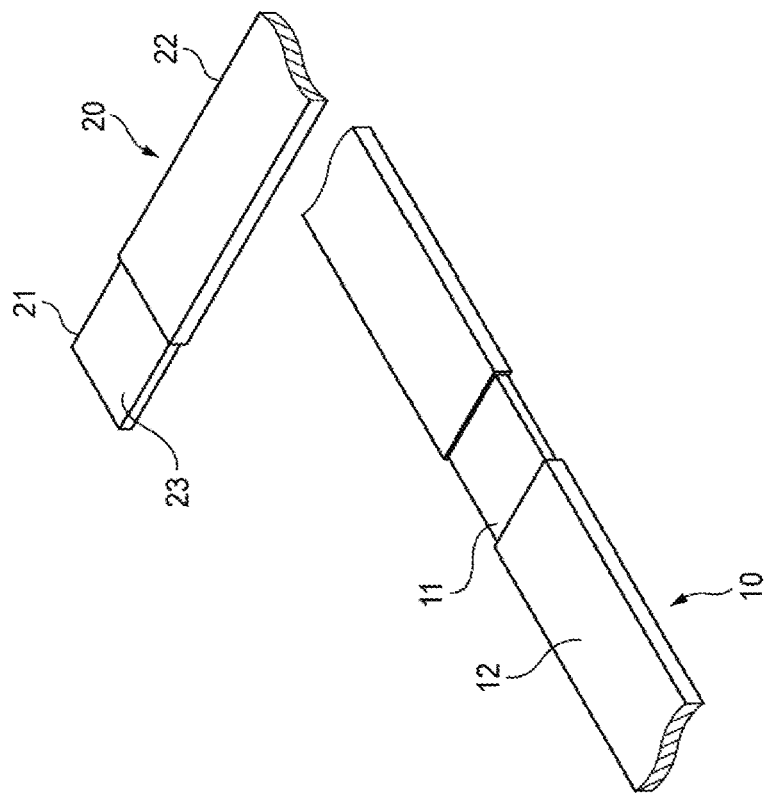
FIGS. 9A and 9B are enlarged perspective views showing states, before and after, respectively, of a connection portion of a routing members connection structure according to a sixth embodiment of the invention, and illustrating how connection is made there.
Figure 9B:
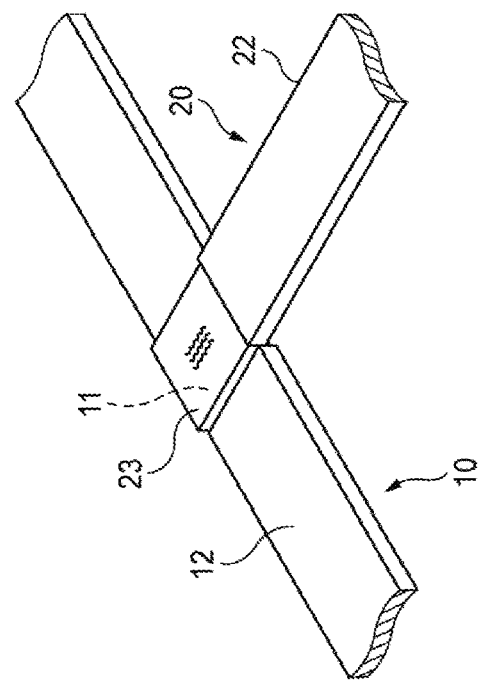

As shown in FIG. 9A, original members of the first trunk routing member 10 and the first branch routing member 20 are prepared and portions of the insulators 12 and 22 are removed to expose portions to be connected to each other of the flat conductors 11 and 21 there. Then the exposed portions of the flat conductors 11 and 21 are connected to each other using an ultrasonic joining machine 60 shown in FIG. 10, whereby a structure shown in FIG. 9B is obtained.

Such ultrasonic joining is repeated until all necessary branch routing members are connected to the first trunk routing member 10. A resulting integrated structure is installed in the vehicle.

Figure 10:
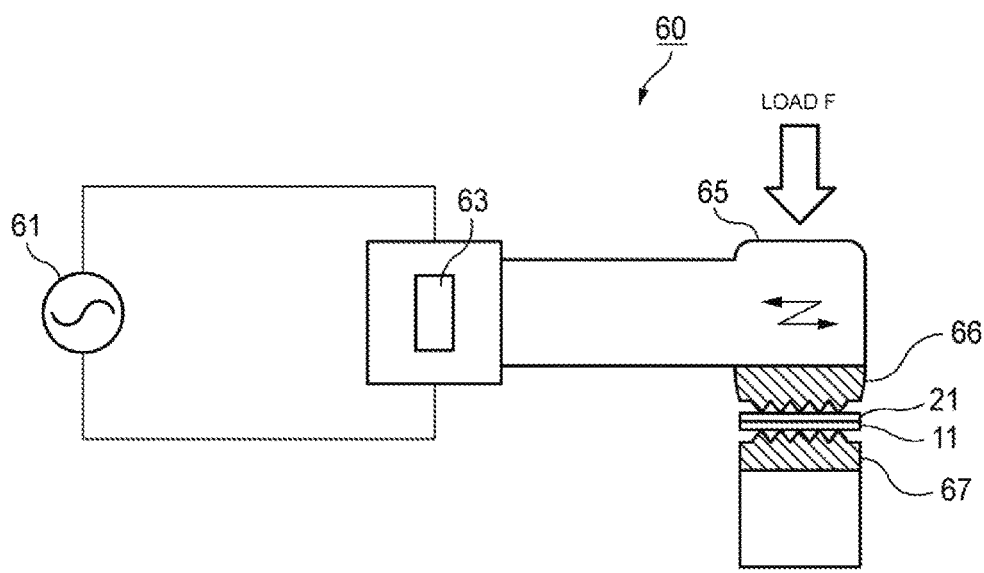
FIG. 10 is a diagram illustrating a specific routing members connection method employed in the sixth embodiment of the invention.

As shown in FIG. 10, the ultrasonic joining machine 60 is equipped with a power source 61, a vibrator 63, and an ultrasonic joining machine main body 65. The flat conductor 11 of the first trunk routing member 10 and the flat conductor 21 of the first branch routing member 20 are sandwiched between an ultrasonic horn 66 which is set in the ultrasonic joining machine main body 65 and an anvil 67 which is set so as to be opposed to the ultrasonic horn 66, and the ultrasonic horn 66 is caused to make reciprocating straight movement of ultrasonic vibration with application of a load F. As a result, impurities such as oxide films are removed by friction between the contact surfaces of the flat conductors 11 and 21, and new surfaces of the flat conductors 11 and 21 come into contact with each other to form adhesion nuclei. A joining area expands from the adhesion nuclei and solid-phase joining is attained.

<Other Modes>

The invention is not limited to the above embodiments and various modifications, improvements, etc. can be made as appropriate within the scope of the invention. The materials, shapes, sets of dimensions, numbers, locations, etc. of the respective constituent elements of each of the above embodiment are not limited to those disclosed but can be determined in desired manners as long as the invention can be implemented.

For example, although in each of the above embodiments the conductor of each routing member is a flat conductor that is flat in cross section, it may be a round conductor that is circular in cross section. In this case, it is preferable to deform a portion, to be joined to a stud bolt, of the conductor of each routing member into a flat shape and join the stud bolt to the flat surface.

In the above-described third to fifth embodiments, the first branch routing member 20 branches off directly from the first branching portion 13 (first stud bolt 14) of the first trunk routing member 10 and the second branch routing member 40 branches off directly from the second branching portion 33 (second stud bolt 34) of the second trunk routing member 30. As in the second embodiment, an alternative structure is possible in which the first branch routing member 20 branches off from the first branching portion 13 (first stud bolt 14) of the first trunk routing member 10 via a power branching box 50 and the second branch routing member 40 branches off from the second branching portion 33 (second stud bolt 34) of the second trunk routing member 30 also via the power branching box 50.

In this case, the power branching box 50 is disposed on the top surface of the floor panel P1 of the vehicle so as to cover the connection portion of the first trunk routing member 10 and the first branch routing member 20 and the connection portion of the second trunk routing member 30 and the second branch routing member 40. The first stud bolt 14, the first terminal portion 23 of the first branch routing member 20, the second stud bolt 34, and the second terminal portion 43 of the second branch routing member 40 are connected to a first portion, a second portion, a third portion, and a fourth portion, different from each other, of a board 51 housed in the power branching box 50, respectively. With this structure, the electrical connection between the first trunk routing member 10 and the first branch routing member 20 can be on/off-switched and the electrical connection between the second trunk routing member 30 and the second branch routing member 40 can be on/off-switched in a desired manner by, for example, forming, in the electric circuit of the board 51, a first switch mechanism for allowing or prohibiting conduction between the first portion and the second portion of the board 51 and a second switch mechanism for allowing or prohibiting conduction between the third portion and the fourth portion of the board 51.

In the above-described third to fifth embodiments, each of the first trunk routing member 10 and the second trunk routing member 30 has the insulator 12 or 32 which covers the flat conductor 11 or 31. Alternatively, in each region where the first trunk routing member 10 and the second trunk routing member 30 are laid on each other, a structure may be employed in which an insulator (cover) is provided so as to cover the flat conductors 11 and 31 together and another insulator is interposed between the flat conductors 11 and 31.

Features of the above-described routing members connection structures according to the embodiments of the invention will be summarized below concisely in the form of items [1] to [5]:

[1] A routing members connection structure which electrically connects a long first trunk routing member (10) which is routed in a vehicle and can transmit power and a first branch routing member (20) which is routed in the vehicle, can transmit power, and branches off from the first trunk routing member (10), wherein:

each of the first trunk routing member (10) and the first branch routing member (20) has a conductor (flat conductor 11, 21) and an insulator (12, 22) that is formed on an outer circumferential surface of the conductor (flat conductor 11, 21);

the first trunk routing member (10) has a post-shaped first fastening member (first stud bolt 14) that is made of a metal and extends outward from a first branching portion (13) where the conductor (flat conductor 11) is exposed without being covered with the insulator (12); and the conductor (flat conductor 11) of the first trunk routing member (10) and the conductor (flat conductor 21) of the first branch routing member (20) are electrically connected to each other via the first fastening member (first stud bolt 14).

[2] The routing members connection structure according to item [1], further comprising a long second trunk routing member (30) which is routed in the vehicle so as to be laid on the first trunk routing member (10) and can transmit power and a second branch routing member (40) which is routed in the vehicle, can transmit power, and branches off from the second trunk routing member (30), wherein:

the second trunk routing member (30) has a conductor (flat conductor 31) and an insulator (32) that is interposed at least between the conductor (flat conductor 31) of the second trunk routing member (30) and the conductor (flat conductor 11) of the first trunk routing member (10);

the second branch routing member (40) has a conductor (flat conductor 41) and an insulator (42) that is formed on an outer circumferential surface of the conductor (flat conductor 41);

the first trunk routing member (10) has a through-hole (15) that penetrates through the first trunk routing member (10) in a lamination direction of the first trunk routing member (10) and the second trunk routing member (30);

the second trunk routing member (30) has a post-shaped second fastening member (second stud bolt 34) that is made of a metal and extends outward from a second branching portion (33) where the conductor (flat conductor 31) is exposed without being covered with the insulator (32) toward the side of the first trunk routing member (10);

the second fastening member (second stud bolt 34) is inserted through the through-hole (15) past one opening thereof facing the second trunk routing member (30) and a tip-side portion of the second fastening member (second stud bolt 34) projects from the other opening of the through-hole (15); and the conductor (flat conductor 31) of the second trunk routing member (30) and the conductor (flat conductor 41) of the second branch routing member (40) are electrically connected to each other via the tip-side portion of the second fastening member (second stud bolt 34).

[3] The routing members connection structure according to item [1], further comprising a long second trunk routing member (30) which is routed in the vehicle so as to be laid on the first trunk routing member (10) and can transmit power and a second branch routing member (40) which is routed in the vehicle, can transmit power, and branches off from the second trunk routing member (30), wherein:

the second trunk routing member (30) has a conductor (flat conductor 31) and an insulator (32) that is interposed at least between the conductor (flat conductor 31) of the second trunk routing member (30) and the conductor (flat conductor 11) of the first trunk routing member (10);

the second branch routing member (40) has a conductor (flat conductor 41) and an insulator (42) that is formed on an outer circumferential surface of the conductor (flat conductor 41);

the second trunk routing member (30) has, in a region in a longitudinal direction of the first trunk routing member (10) and the second trunk routing member (30), a non-laminated portion (35) where at least one of the first trunk routing member (10) and the second trunk routing member (30) is curved in a width direction that is perpendicular to the longitudinal direction and a lamination direction of the first trunk routing member (10) and the second trunk routing member (30) and hence the second trunk routing member (30) is not laid on and is spaced from the first trunk routing member (10);

the second trunk routing member (30) has a post-shaped second fastening member (second stud bolt 34) that is made of a metal and extends outward from a second branching portion (33) that is part of the non-laminated portion (35) and where the conductor (flat conductor 31) is exposed without being covered with the insulator (32); and the conductor (flat conductor 31) of the second trunk routing member (30) and the conductor (flat conductor 41) of the second branch routing member (40) are electrically connected to each other via the second fastening member (second stud bolt 34).

[4] The routing members connection structure according to item [1], further comprising a long second trunk routing member (30) which is routed in the vehicle so as to be laid on the first trunk routing member (10) and can transmit power and a second branch routing member (40) which is routed in the vehicle, can transmit power, and branches off from the second trunk routing member (30), wherein:

the second trunk routing member (30) has a conductor (flat conductor 31) and an insulator (32) that is interposed at least between the conductor (flat conductor 31) of the second trunk routing member (30) and the conductor (flat conductor 11) of the first trunk routing member (10);

the second branch routing member (40) has a conductor (flat conductor 41) and an insulator (42) that is formed on an outer circumferential surface of the conductor (flat conductor 41);

the first trunk routing member has a cut (16) that extends from a side edge on one side in a width direction that is perpendicular to a longitudinal direction and a lamination direction of the first trunk routing member (10) and the second trunk routing member (30) toward the other side edge in the width direction;

the second trunk routing member (30) has an exposed portion (36) that coextends with the cut (16) and hence is exposed without being covered with the first trunk routing member (10);

the second trunk routing member (30) has a post-shaped second fastening member (second stud bolt 34) that is made of a metal and extends outward toward the side of the first trunk routing member (10) from a second branching portion (33) that is part of the exposed portion (36) and where the conductor (flat conductor 31) is exposed without being covered with the insulator (32); and the conductor (flat conductor 31) of the second trunk routing member (30) and the conductor (flat conductor 41) of the second branch routing member (40) are electrically connected to each other via the second fastening member (second stud bolt 34).

[5] The routing members connection structure according to item [1], further comprising a power branching box (50) which is disposed in the vehicle so as to cover a connection portion of the first trunk routing member (10) and the first branch routing member (20) and houses a board (51) on which an electric circuit is formed, wherein:

the first fastening member (first stud bolt 14) is connected to a first portion (51a) of the board and the conductor (flat conductor 21) of the first branch routing member (20) is connected to a second portion (51b) that is different from the first portion (51a), and the conductor (flat conductor 11) of the first trunk routing member (10) and the conductor (flat conductor 21) of the first branch routing member (20) are electrically connected to each other via the first fastening member (first stud bolt 14) and the electric circuit of the board (51).

What is claimed is:

1. A routing members connection structure which electrically connects a long first trunk routing member which is routed in a vehicle and can transmit power and a first branch routing member which is routed in the vehicle, can transmit power, and branches off from the first trunk routing member, wherein:

each of the first trunk routing member and the first branch routing member has a conductor and an insulator that is formed on an outer circumferential surface of the conductor;

the first trunk routing member has a post-shaped first fastening member that is made of a metal and extends outward from a first branching portion where the conductor is exposed without being covered with the insulator; and the conductor of the first trunk routing member and the conductor of the first branch routing member are electrically connected to each other via the first fastening member.

2. The routing members connection structure according to claim 1, further comprising a long second trunk routing member which is routed in the vehicle so as to be laid on the first trunk routing member and can transmit power and a second branch routing member which is routed in the vehicle, can transmit power, and branches off from the second trunk routing member, the routing members connection structure further characterized in:

the second trunk routing member has a conductor and an insulator that is interposed at least between the conductor of the second trunk routing member and the conductor of the first trunk routing member;

the second branch routing member has a conductor and an insulator that is formed on an outer circumferential surface of the conductor;

the first trunk routing member has a through-hole that penetrates through the first trunk routing member in a lamination direction of the first trunk routing member and the second trunk routing member;

the second trunk routing member has a post-shaped second fastening member that is made of a metal and extends outward from a second branching portion where the conductor is exposed without being covered with the insulator toward the side of the first trunk routing member;

the second fastening member is inserted through the through-hole past one opening thereof facing the second trunk routing member and a tip-side portion of the second fastening member projects from the other opening of the through-hole; and the conductor of the second trunk routing member and the conductor of the second branch routing member are electrically connected to each other via the tip-side portion of the second fastening member.

3. The routing members connection structure according to claim 1, further comprising a long second trunk routing member which is routed in the vehicle so as to be laid on the first trunk routing member and can transmit power and a second branch routing member which is routed in the vehicle, can transmit power, and branches off from the second trunk routing member, wherein:

the second trunk routing member has a conductor and an insulator that is interposed at least between the conductor of the second trunk routing member and the conductor of the first trunk routing member;

the second branch routing member has a conductor and an insulator that is formed on an outer circumferential surface of the conductor;

the second trunk routing member has, in a region in a longitudinal direction of the first trunk routing member and the second trunk routing member, a non-laminated portion where at least one of the first trunk routing member and the second trunk routing member is curved in a width direction that is perpendicular to the longitudinal direction and a lamination direction of the first trunk routing member and the second trunk routing member and hence the second trunk routing member is not laid on and is spaced from the first trunk routing member;

the second trunk routing member has a post-shaped second fastening member that is made of a metal and extends outward from a second branching portion that is part of the non-laminated portion and where the conductor is exposed without being covered with the insulator; and the conductor of the second trunk routing member and the conductor of the second branch routing member are electrically connected to each other via the second fastening member.

4. The routing members connection structure according to claim 1, further comprising a long second trunk routing member which is routed in the vehicle so as to be laid on the first trunk routing member and can transmit power and a second branch routing member which is routed in the vehicle, can transmit power, and branches off from the second trunk routing member, wherein:

the second trunk routing member has a conductor and an insulator that is interposed at least between the conductor of the second trunk routing member and the conductor of the first trunk routing member;

the second branch routing member has a conductor and an insulator that is formed on an outer circumferential surface of the conductor;

the first trunk routing member has a cut that extends from a side edge on one side in a width direction that is perpendicular to a longitudinal direction and a lamination direction of the first trunk routing member and the second trunk routing member toward the other side edge in the width direction;

the second trunk routing member has an exposed portion that coextends with the cut and hence is exposed without being covered with the first trunk routing member;

the second trunk routing member has a post-shaped second fastening member that is made of a metal and extends outward toward the side of the first trunk routing member from a second branching portion that is part of the exposed portion and where the conductor is exposed without being covered with the insulator; and the conductor of the second trunk routing member and the conductor of the second branch routing member are electrically connected to each other via the second fastening member.

5. The routing members connection structure according to claim 1, further comprising a power branching box which is disposed in the vehicle so as to cover a connection portion of the first trunk routing member and the first branch routing member and houses a board on which an electric circuit is formed, wherein:

the first fastening member is connected to a first portion of the board and the conductor of the first branch routing member is connected to a second portion that is different from the first portion; and the conductor of the first trunk routing member and the conductor of the first branch routing member are electrically connected to each other via the first fastening member and the electric circuit of the board.

* * * * *